United States Patent Office 3,338,834
Patented Aug. 29, 1967

3,338,834
PROCESS FOR PREPARING NITROGEN AND BORON-CONTAINING LUBRICATING OIL ADDITIVES
Andrew D. Abbott, Greenbrae, Calif., assignor to Chevron Research Company, San Francisco, Calif., a corporation of Delaware
No Drawing. Filed Nov. 19, 1965, Ser. No. 508,824
7 Claims. (Cl. 252—49.6)

This invention relates to a process for producing novel, highly effective lubricating additive compositions. More particularly, it relates to a process for the production of a nitrogen and boron-containing lubricating additive combination possessing excellent detergency, antioxidant, and anticorrosant properties.

It is known that alkenyl succinimides formed, for example, by the reaction of maleic anhydride with an olefinic hydrocarbon, followed by reacting the product with an amine, often function as useful ashless detergent additives in lubricating oils. The detergents operate to remove oxidation products from various engine parts and disperse them in the oil, thus reducing wear and increasing useful engine life. Examples of such succinimides which are especially useful are monoalkenyl succinimides formed by reacting a monoalkenyl succinic anhydride or acid of 50 to 250 alkenyl carbon atoms with a polyalkylene polyamine, such as tetraethylenepentamine, to yield a succinimide having excess primary and secondary amino groups.

Further, it has been known that the incorporation of boron in such succinimide detergents increases the ability of the compounds to increase their detergency, antioxidant, and anticorrosant characters. This has been accomplished in the past by reacting a boron compound, such as various boron acids, boron oxide or halides, directly with the substituted succinimides.

It has now been found that boron and nitrogen-containing lubricant additives possessing excellent detergent characteristics and enhanced antioxidant and anticorrosant properties due to increased boron retention can be produced by reacting at a temperature in the range of 300 to 400° F. a boron acid or oxide with a tertiary-alkyl primary amine having a molecular weight from about 250 to about 500, and then mixing the product of this reaction with an alkenyl succinimide of tetraethylene pentamine.

Thus the boron compounds that are suitable for use in the process of this invention include boric acid, boron oxide, esters of boric acid, etc. In each case, the by-product of the reaction with the amine may be removed from the reaction mixture, if necessary, by distillation, etc. Thus, in the case of reaction with boric acid, water will be removed; in the case of boric acid esters, an alcohol will be removed.

The amine reactant, as previously noted, is a tertiary-alkyl primary amine of relatively high molecular weight. Thus the amine may be a mixture having a molecular weight range of from 250 to 500 with individual compounds in the mixture having molecular weights not less than 200. A preferred amine is a compound marketed by the Rohm & Haas Company as Primene JM–T. This material is described as a tertiary-alkyl primary amine having a molecular weight of 330, a boiling range of 510–580° F. at 760 mm. Hg, a weight of 6.98 lbs./gal. at 77° F.

The succinimides employed in the process of this invention are, as previously noted, materials prepared by reacting about one molecular proportion of an alkenylsuccinic anhydride with one mol of tetraethylenepentamine. The alkenyl-succinic anhydride contains an alkenyl group of from about 50 to about 250 carbon atoms. The reaction of an olefinic hydrocarbon with maleic anhydride to produce an alkenylsuccinic anhydride is well known. The olefin is most conveniently obtained by the polymerization of an olefin of 2 to 5 carbon atoms. Thus olefins, such as ethylene, propylene, butylene and mixtures thereof, may be polymerized. The polymerization of these materials to form high molecular weight monoolefins is well known and will not be further described.

The process of the invention is carried out in the following manner: From 2.0 to 3.5 mols, preferably about 2.65 mols, of boric acid are mixed with 1 mol of the amine, heated with stirring to a temperature of from 300 to 400° F. and maintained at that temperature for a sufficient time to distill off the water of reaction. A preferred temperature range for this step is from about 330 to 370° F. Next, a quantity of the alkenyl succinimide is then mixed with the product of the previous reaction. The mixing is accomplished at a temperature of 300 to 400° F., preferably from 340 to 360° F. This may be done by heating the succinimide to the required temperature (at which the boric-acid amine reaction product has been held) or by adding the succinimide at ambient temperature at a very slow rate while keeping the reaction mixture at the required temperature. The quantity of succinimide that is mixed with the boric-amine reaction product is that such that the final mixture contains from 50 to 95% by weight of the succinimide. Thus, the weight ratio of succinimide to boric-amine reaction product will vary from 1:1 to 20:1.

It will usually not be necessary to filter or otherwise treat the additive mixture after mixing, since normally no unreacted material will remain.

The following examples illustrate the preparation of the additives of this invention. The examples are illustrative and non-limiting.

*Example 1.—Preparation of boric acid-amine reaction product*

274 g. (0.83 mol) of Primene JM-T, a tertiary-alkyl primary amine having a molecular weight of 330, and 136 g. (2.20 mols) of 99.9% boric acid were placed in a reaction vessel equipped with a stirrer, heating mantle and water-cooled condenser and maintained at a temperature of about 340° F. for 1.5 hours. During this period, 37 g. (2.1 mols) of $H_2O$ were distilled from the mixture. At this point, 1090 g. of a monoalkenyl succinimide of tetraethylenepentamine (molecular weight 1300) at a temperature of 340° F. was added, and the mixture was heated for 0.4 hour at 340–350° F. The mixture was allowed to cool, yielding 1436 g. of a viscous material having a boron content of 1.68% (1.65% theory), a nitrogen content of 2.46%, viscosity at 100° F. of 5330, and at 210° F. of 355.

*Example 2*

The procedure of Example 1 was followed employing 271 g. (0.82 mol) of the amine, 135 g. (2.18 mols) of boric acid and 1078 g. of the succinimide. The first reaction was allowed to proceed for 0.85 hour at 340° F., during which time 44 g. (2.4 mols) of water was withdrawn. The second mixture was allowed to heat for 0.5 hour at 340–350° F., yielding 1434 g. of a mixture having a nitrogen content of 2.43% and a boron content of 1.69% (theory 1.65%).

*Example 3.—Reaction of boric acid*

The procedure of Example 1 was followed employing in place of Primene JM-T, Primene 81–R, also a Rohm & Haas product, a tertiary-alkyl primary amine having a molecular weight of 191. The mixture formed was a heavy gel that was insoluble in the alkenyl succinimide and in oil and was thus unsuitable as a lubricating oil additive.

*Example 4*

The procedure of Example 1 was followed employing a sec-alkyl primary amine having a molecular weight of 320. As in Example 3, the produce was insoluble in the alkenyl succinimide and in oil.

It is obvious that the material prepared from the lower molecular weight tertiary-alkyl amine and that prepared from sec-alkyl amine are unsuitable for use as lubricating oil additives. The amine employed must be a tertiary-alkyl primary amine of the molecular weight specified previously, e.g., mixtures from 250 to 500 with individual components not being less than 200.

The lubricating oils in which the additive mixtures may be employed include a wide variety of lubricating oils, such as naphthenic-base, paraffin-base, and mixed-base lubricating oils, other hydrocarbon liubricants, e.g., lubricating oils derived from coal products, the synthetic oils, e.g., alkylene polymers (such as polymers of propylene, butylene, etc., and the mixtures thereof), alkylene oxide-type polymers (e.g., propylene oxide polymers) and derivatives, including alkylene oxide polymers prepared by polymerizing the alkylene oxide in the presence of water or alcohols, e.g., ethyl alcohol, dicarboxylic acid esters (such as those which are prepared by esterifying such dicarboxylic acids as adipic acid, azelaic acid, suberic acid, sebacic acid, alkanol succinic acid, fumaric acid, maleic acid, etc., with alcohols such as butyl alcohol, hexyl alcohol, 2-ethyl hexyl alcohol, dodecyl alcohol, etc.), liquid esters of acids of phosphorus, alkyl benzenes (e.g., monoalkyl benzene such as dodecyl benzene, tetradecyl benzene, etc.), and dialkyl benzenes (e.g., n-nonyl 2-ethyl hexyl benzene); polyphenyls (e.g., biphenyls and terphenyls), alkyl biphenyl esters, polymers of silicon (e.g., tetraethyl silicate tetraisopropyl silicates, tetra(4-methyl-2-tetraethyl) silicate, hexyl (4-methyl-2-pentoxy) disiloxane, poly(methyl) siloxane, poly(methylphenyl) siloxane, etc. Synthetic oils of the alkylene oxide-type polymers which may be used include those exemplified by the alkylene oxide polymers.

The additive combinations are employed in the oils in amounts sufficient to impart desired detergency, antioxidant, and anticorrosant characteristics. More particularly, they are employed in amounts of from 0.1 to 20% by weight and preferably from 0.25 to 8% by weight.

In addition to the detergent, antioxidant, anticorrosant mixtures, there may be also employed in combination therewith in the oils other lubricating oil additives, for example, supplemental detergents, antioxidants and anticorrosants, extreme pressure agents, viscosity index improvers, pour point depressing agents, anti-foam agents, and rust inhibiting agents.

I claim:
1. A process for preparing nitrogen and boron-containing lubricating oil additive combinations which comprises the steps of (A) reacting at a temperature of 300° F. to 400° F. from 2.5 to 2.75 mols of boron acid with 1 mol of a tertiary-alkyl primary amine having a molecular weight of from 250 to 500, and (B) mixing one part of the product of step A at a temperature of 300–400° F. with from 0.5 to 20 parts of monoalkenyl succinimide of tetraethylenepentamine.
2. The process of claim 1 wherein the alkenyl group of the alkenyl succinimide contains from 50 to 250 carbon atoms.
3. The process of claim 2 in which step A is carried out at a temperature of 330–360° F.
4. The process of claim 3 in which in step B the product of the step A is mixed with about 1 part of monoalkenyl succinimide.
5. A nitrogen and boron-containing lubricating oil additive combination formed by the process of claim 1.
6. The additive combination of claim 5 in which the alkenyl group of the monoalkenyl succinimide is derived from a polyolefin having a molecular weight of about 1,000.
7. The additive combination of claim 6 in which the ratio of alkenyl succinimide to the product of step A is from 1:1 to 4:1.

References Cited

UNITED STATES PATENTS

| 2,497,521 | 2/1950 | Trautman | 252—49.6 |
| 3,087,936 | 4/1963 | Le Suer | 252—49.6 |
| 3,172,892 | 3/1965 | Le Suer | 260—326.5 |

FOREIGN PATENTS

| 666,629 | 7/1963 | Canada. |

DANIEL E. WYMAN, *Primary Examiner.*

W. H. CANNON, *Assistant Examiner.*